United States Patent [19]
Harbison

[11] Patent Number: 5,366,266
[45] Date of Patent: Nov. 22, 1994

[54] LIFTABLE VEHICLE COVER WITH A LOW PROFILE FRAME

[76] Inventor: Charles H. Harbison, 3217 Georgetown Pl., Birmingham, Ala. 35216

[21] Appl. No.: 137,349
[22] Filed: Oct. 18, 1993
[51] Int. Cl.⁵ .............................................. B60P 7/04
[52] U.S. Cl. ......................................... 296/100; 296/165; 16/364
[58] Field of Search ............... 296/100, 160, 165, 176; 16/364

[56] References Cited

U.S. PATENT DOCUMENTS

| | | | |
|---|---|---|---|
| 2,531,140 | 11/1950 | Linde | 296/24.1 X |
| 3,155,423 | 11/1964 | Cripe | 296/100 |
| 3,231,305 | 1/1966 | Beckman | 296/100 |
| 3,582,130 | 6/1971 | Borskey | 296/176 |
| 3,649,073 | 3/1972 | Whittemore | 296/100 |
| 3,770,314 | 11/1973 | Borskey | 296/176 |
| 4,362,258 | 12/1982 | French | 296/160 X |
| 4,768,824 | 9/1988 | Andonian | 296/165 |
| 4,848,824 | 7/1989 | Smith et al. | 296/100 |
| 4,964,669 | 10/1990 | Geier | 296/100 X |
| 5,213,390 | 5/1993 | Borchers | 296/100 X |

Primary Examiner—David M. Mitchell
Assistant Examiner—Gary C. Hoge
Attorney, Agent, or Firm—Veal & Associates

[57] ABSTRACT

An improved liftable cover for a vehicle such as a light truck. A pair of center pivoted cross members mounted to the lateral sides of the vehicle to support and lift said cover. The improvement is two pairs of slidable hinges each having a block pivotally connected to ends of the cross members. This block is permitted limited horizontal movement along a cylinder rod mounted to the lateral sides of the vehicle. The cross members are U-shaped with an open end that overlies the block providing a low profile cover in the lowered position.

15 Claims, 4 Drawing Sheets

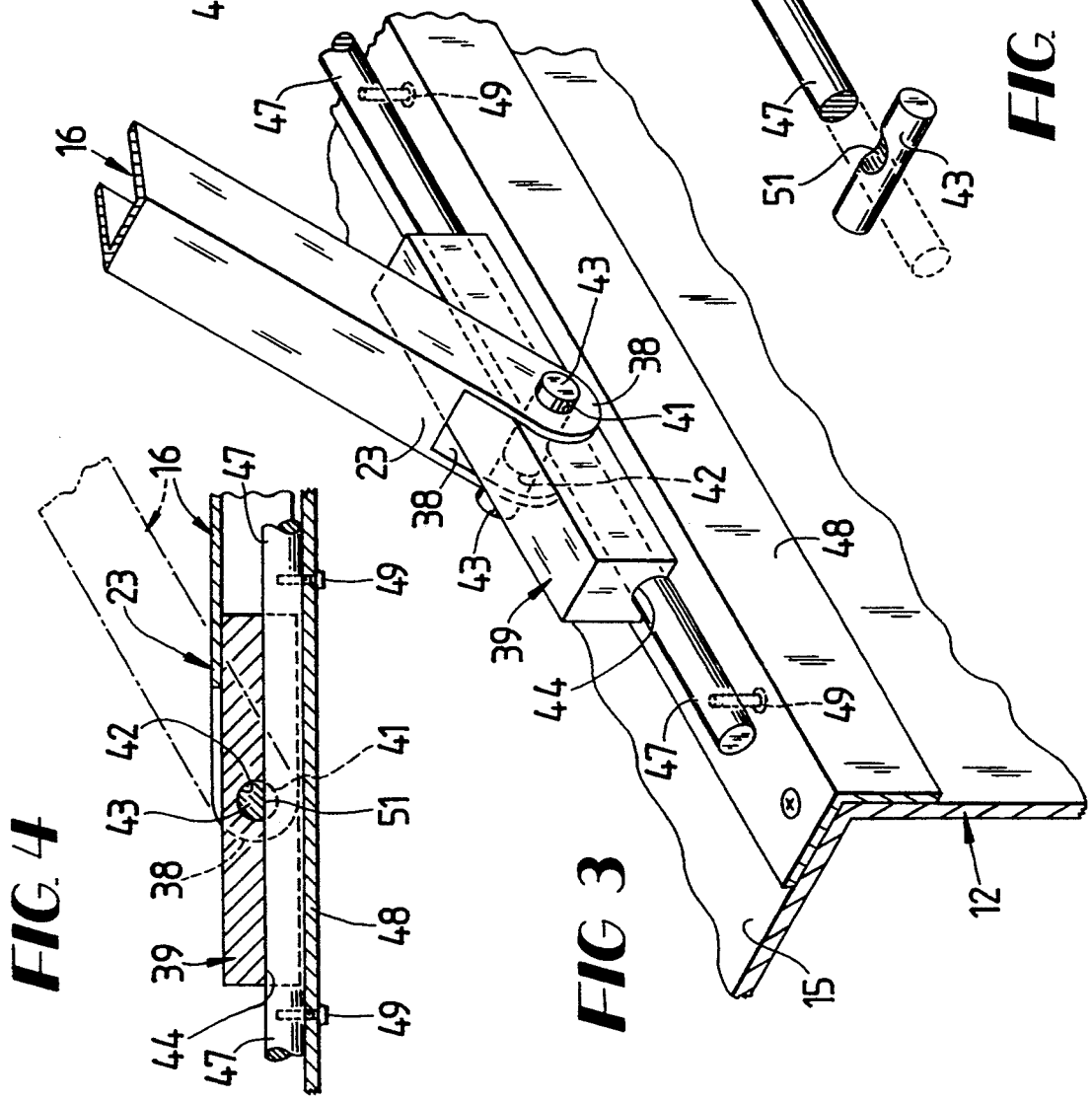

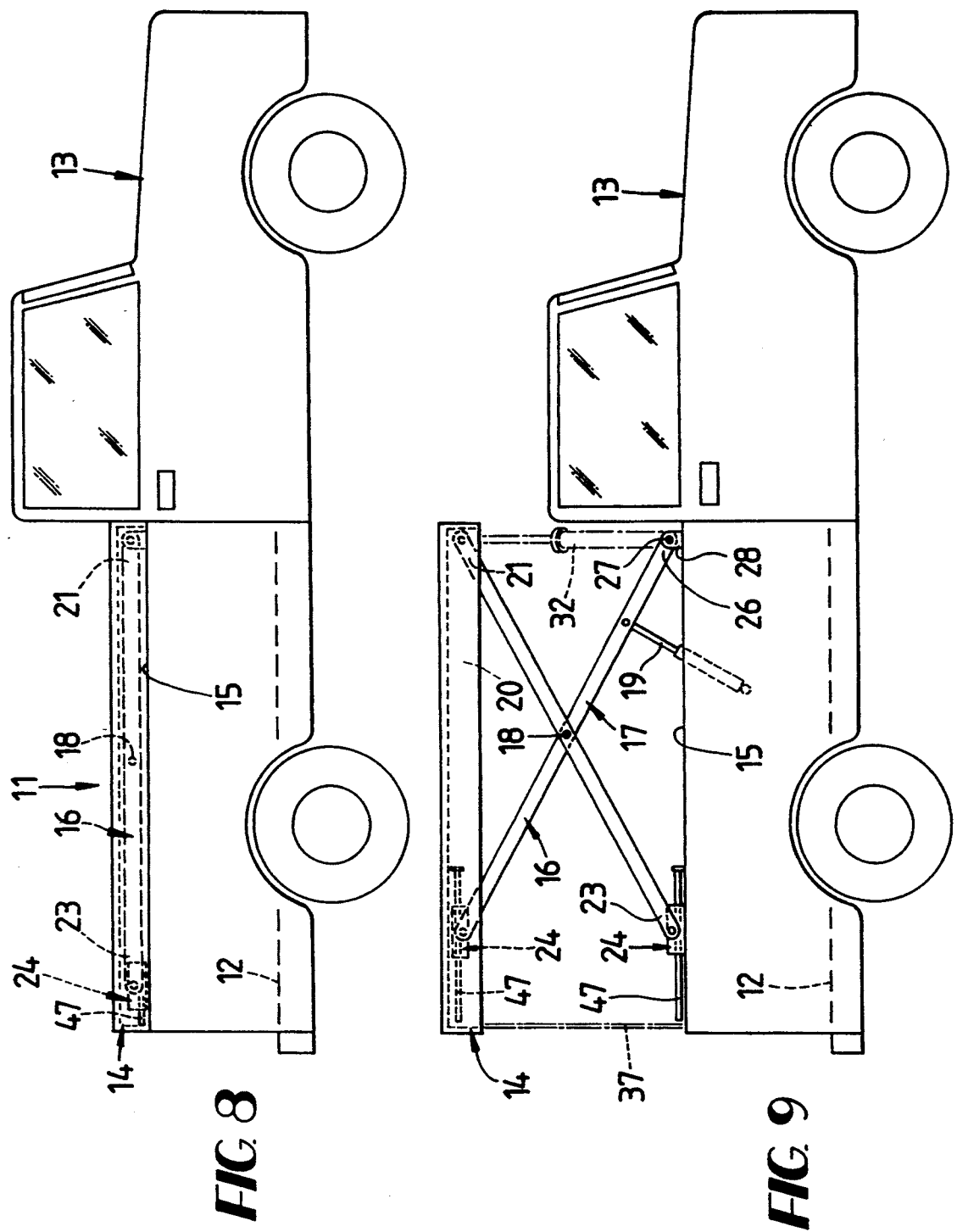

LIFTABLE VEHICLE COVER WITH A LOW PROFILE FRAME

FIELD OF THE INVENTION

The present invention relates to a liftable cover for a truck bed. More particularly, the present invention relates to a liftable cover having a slidable hinge mechanism providing a truck cover with a low profile in a lowered position.

BACKGROUND OF THE INVENTION

Truck beds are normally covered with a rigid shell or topper to protect cargo within the bed. These shells are restricted in height by their shape and do not adjust for loads of varying height. Liftable covers for the open portion or bed of trucks or trailers have been disclosed in the past. By example, U.S. Pat. No. 3,155,423 discloses a liftable vehicle top for a pickup truck issued to Cripe in 1964. A trailer vehicle for hot line tools with a top lifting mechanism is disclosed in U.S. Pat. No. 2,531,140 issued to Linde. Other truck cover devices include a foldable top for a truck bed issued to Geier in U.S. Pat. No. 4,964,669 and a collapsible truck bed covering structure as disclosed in U.S. Pat. No. 4,768,824 issued to Andonian.

The liftable tops listed above are unduly complex in the support structure and are expensive to install, making them undesirable to the average truck owner. Liftable tops disclosed above have mechanisms which occupy and interfere with the interior of the truck or trailer bed and reduce the storage capability. These liftable tops do not rest in a low profile position atop the truck frame. In fact, most have hinges or mechanisms such that the upper surface of the top or cover is at least several inches above the truck bed frame making the cover bulky and aesthetically unpleasing. Many consumers spend substantial sums of money purchasing or customizing a truck and value the contours of the truck shape. These consumers do not want shells or high profile covers disrupting the lines of the "classic" truck shape. Occasions arise, however, where these consumers have a need to cover cargo and desire some type of cover. Thus, there is a need in the truck cover industry for a liftable top with a low profile in the lowered position.

SUMMARY OF THE INVENTION

With the foregoing in mind, it is an object of this invention to provide a lift cover for trucks which is both simple and inexpensive.

It is another object of this invention to provide a lift cover for a truck which maintains a low profile in a lowered position.

A further object of this invention is to provide a liftable cover for a truck which is stable when transported in the raised position.

These and other objects of the present invention are provided by a cover supported by a pair of cross member supports. The cross members are pivotally connected at forward cab ends to facilitate raising and lowering of the cover. A pair of gas cylinders aid in supporting and holding the cross members and cover in an upright position. The cross members slidably connect and pivotally hinge to rearward portions of the truck bed and the cover. The slidable connection is a block movable along rods mounted to the cover and truck frame. Cross members are U-shaped members with an open end which overlies the block such that the frame rests atop the truck frame with a low vertical profile. Telescoping rods provide lateral stability to a front frame of the cover in an extended position. Vertical rods engage the cover and truck bed thereby locking the rear of the frame in the upright position.

BRIEF DESCRIPTION OF THE DRAWINGS

Apparatus embodying features of the present invention are depicted in the accompanying drawings which form a portion of this disclosure and wherein:

FIG. 3 is a perspective view of the slidable hinge assembly;

FIG. 4 is a side elevational view of the slidable hinge assembly;

FIG. 5 is a perspective view of a lower surface of slidable block and pin;

FIG. 6 is a perspective view of pin and cylindrical rod;

FIG. 7 is a sectional view of slidable hinge assembly;

FIG. 8 is a side view of liftable cover in a lowered position; and

FIG. 9 is a side view of liftable cover in a raised position.

DESCRIPTION OF A PREFERRED EMBODIMENT

Figure 1:
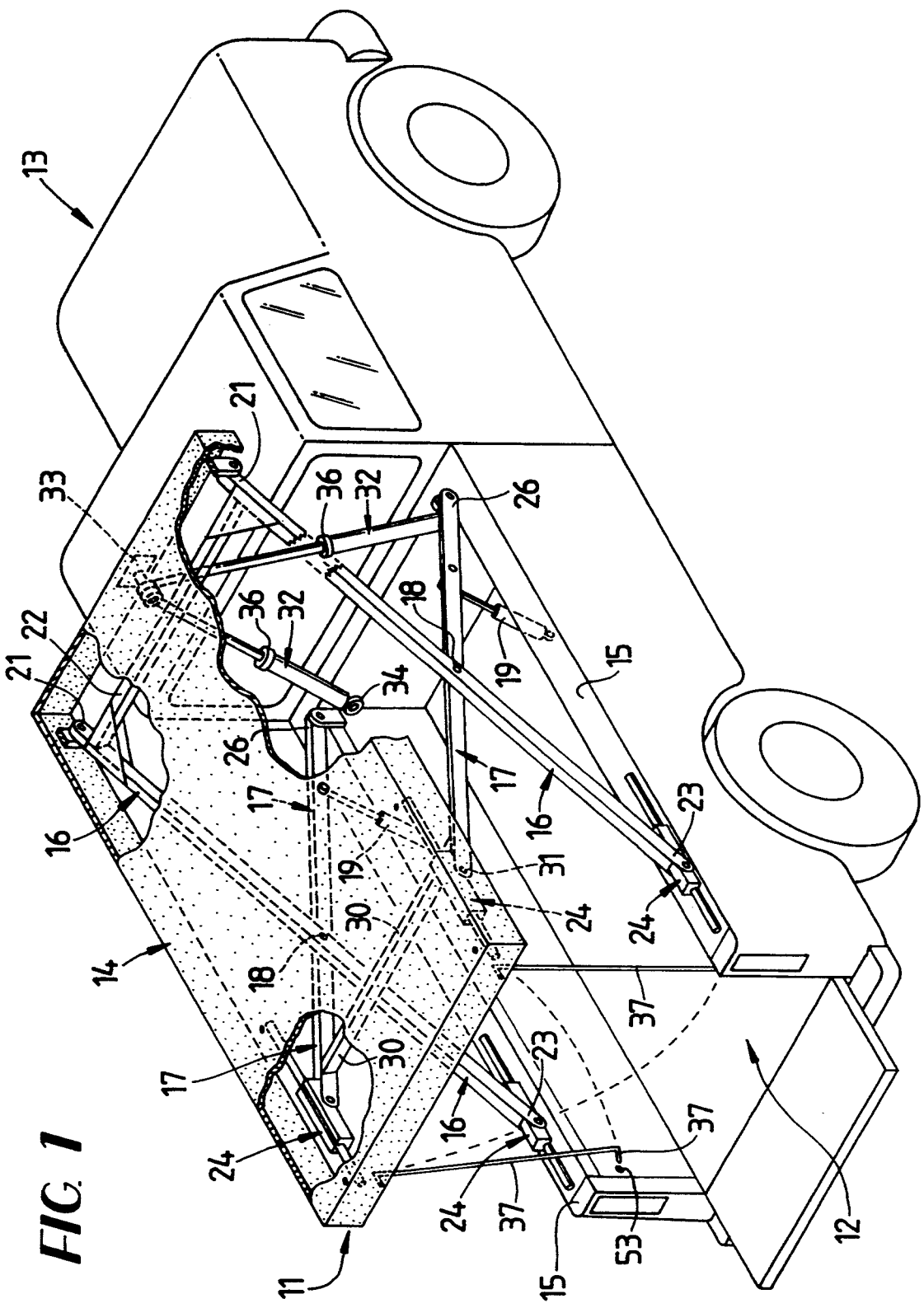
FIG. 1 is a perspective view of the present invention mounted upon a vehicle.

FIG. 1 is a perspective view showing a liftable frame designated generally by the reference numeral 11. The frame 11 is mounted to the bed 12 of a truck 13. Liftable frame 11 includes a cover 14 which is typically formed from light weight reinforced plastic or fiberglass although any material which is sturdy in construction and resistant to weather will form a suitable cover 14. Such covers 14 may be a rectangular frame having a planar plastic member or panel affixed to the frame.

The cover 14 is supported by first cross frame members 16 and second cross frame members 17 pivotally connected at a central pin 18. A pair of first and second cross members 16, 17 are mounted to each lateral siderail 15 of the bed 12 of truck 13. A pair of gas cylinders 19 mount between said second cross frame members 17 and bed 12 to aid in the lifting and support of cover 14. Upper ends 21 of first cross frame members 16 pivotally connect to a cover 14 which is transversely mounted between first cross frame members 16. Lower ends 23 of first cross frame members 16 pivotally mount to a slidable hinge assembly generally indicated by reference numeral 24 and described hereinafter in greater detail.

Figure 2:
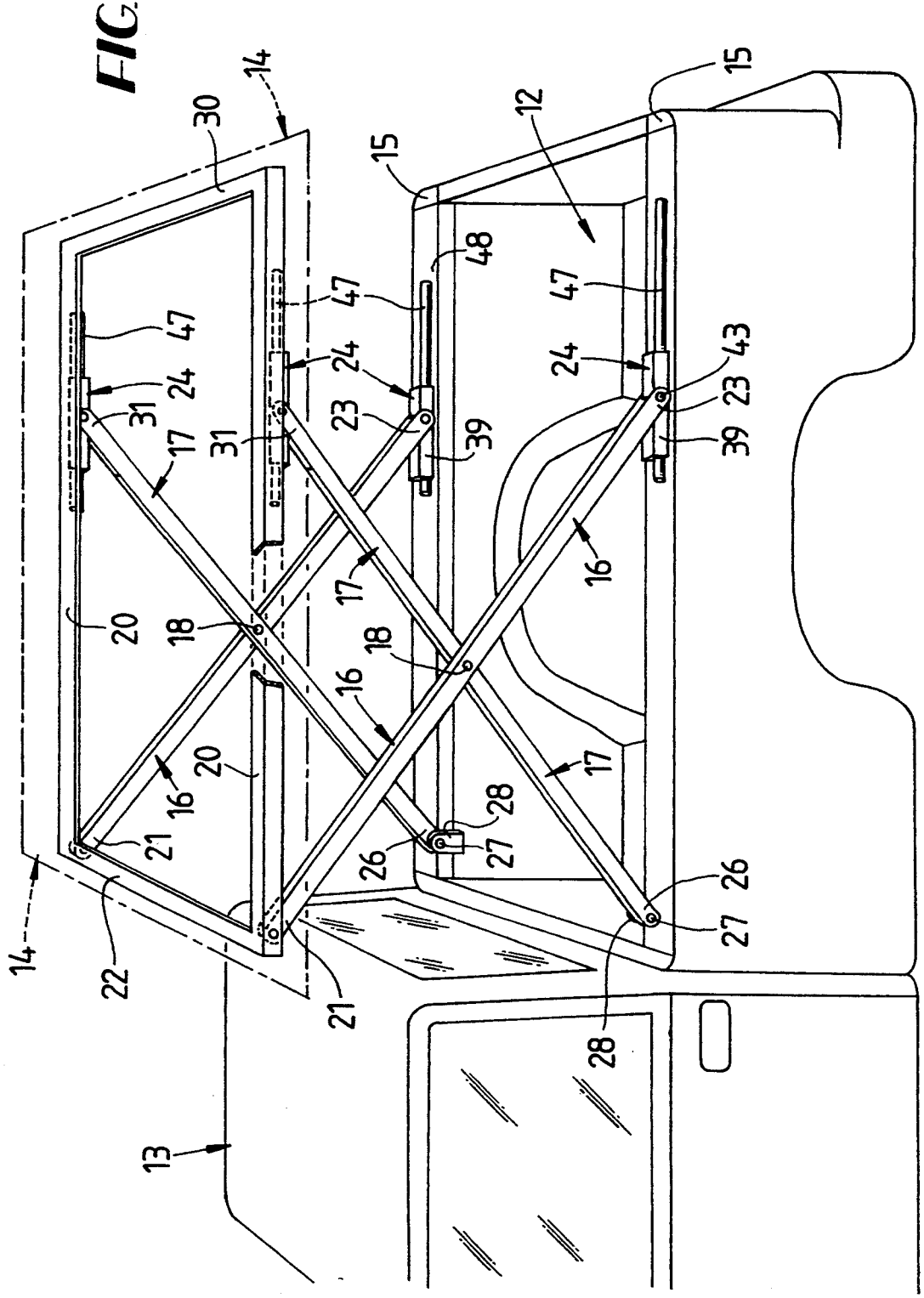
FIG. 2 is a perspective view of the liftable frame mounted on a vehicle.

Lower ends 26 of second cross members 17 are pivotally connected at pin 27 to a bracket 28 mounted to each lateral siderail 15 of bed 12. The upper end 31 of the second cross frame member 17 pivotally mounts to a slidable hinge assembly 24. In the embodiment shown in FIG. 1, the hinge assembly 24 mounts directly to cover 14. However, another embodiment shown in FIG. 2 includes parallel frame members 20. The slidable hinge assembly 24 is affixed beneath a parallel frame member 20. A front frame member 22 and a rear frame member 30 transversely mount between parallel frame members 20 which forms a second embodiment. Thus, a rectangular frame is formed which may be covered with flexible material or which supports a planar cover 14 as best seen in FIG. 2. The lower end 23 of first cross member 16 pivotally connects to a slidable hinge assembly 24 which is mounted to siderails 15 of vehicle 13.

A pair of telescoping support tubes 32 pivotably connect to a plate 33 mounted to front frame member 22 and are pivotally connected to brackets 34 of bed 12. The support tubes 32 provide lateral stability to cover 14 in a raised position as shown in FIG. 1. An adjustable collar 36 locks the rods into an extended position. Vertical prop rods 37 engage and lock the rear frame member 30 in a raised position at a predetermined height from bed 12 of truck 13.

Referring now to FIG. 3, the slidable hinge assembly 24 is shown in detail. Each cross member 16 and 17 is a square tubular member. At one end thereof, one wall thereof is removed to allow the slidable hinge assembly to be received within the tube when the cover is in the lowered position. A lower end 23 of first cross frame member 16 forms tabs 38 which engage a block 39. Apertures 41 extend through tabs 38 and aperture 42 extends through block 39. A pivot pin 43 inserts within apertures 41 and 42 to pivotally connect lower end 23 to block 39 as shown in FIGS. 4 and 5.

A longitudinally extending slot 44 is formed or cut along a lower surface 46 of block 39. The slot 44 is semi-cylindrical in shape as best seen in FIG. 5. Slot 44 receives a horizontal cylindrical rod 47. The transverse dimension of slot 44 is smaller than the transverse dimension of rod 47 which prevents disengagement of rod 47 from slot 44. The cylindrical rod 47 is mounted to a plate 48 of siderail 15 of bed 12 by fasteners 49 such as screws or bolts which extend below the lower surface 46 of block 39 into slot 44. The block 39 is permitted limited horizontal movement along rod 47. Pivot pin 43 has defined thereon a relieved concave portion 51 which accommodates rod 47 as is best seen in FIG. 6. Hinge assembly 24 also mounts to side members 20 for pivotally connecting the upper end 31 of second cross members 17 in the same manner as described hereinabove as in FIG. 2.

The first and second cross members 16, 17 overlie the block 39 when the cover 14 is in a lowered position as shown in FIG. 7. Thus the cover 14, frame members 20 and cross members 16, 17 rest atop sides of bed 12 in a low profile manner as seen in FIG. 8.

In actual operation, the cover 14 rests atop the siderails 15 of bed 12 of truck 13 as shown in FIG. 8. As discussed hereinabove, the cross members 16, 17 overlie block 39 to maintain a low profile of cover 14 relative truck 13. The cover 14 is manually raised by an operator and gas cylinders 19 aid in supporting the second cross members 17. Lifting of cover 14 at the rear of the truck with the assistance of gas cylinders 19 causes lower ends 23 of first cross members 16 to pivot about pin 43 and slide block 39 horizontally along cylindrical rod 47 and cover 14, and causes the upper end 31 of second cross member 17 to pivot about pin 43 of block 39 which slides along cylindrical rod 47 such that when the cover 14 and supporting cross members 16, 17 are fully raised, a pair of vertical propping rods 37 are engaged in apertures formed within cover 14 and said bed 12 to lock said cover 14 in the fully raised position. A pair of telescoping support rods 32 are pivotally connected at one end to a center bracket 33 of said front frame and are pivotally connected at brackets 34 to bed 12 of truck 13 providing lateral stability to the cover 14 and cross members 16, 17 as seen in FIG. 9. Although I have shown my invention in but one embodiment, it will be obvious to those skilled in the art that it is not so limited but is susceptible of normal changes and modifications without departing from the spirit thereof.

What is claimed is:

1. A cover for use on the bed of a pickup truck wherein said bed comprises a pair of longitudinally disposed parallel side walls, said cover comprising a rectangular planar member of sufficient dimension to simultaneously extend to both sidewalls of said bed, a first pair of parallel support members hingedly attached at a forward end thereof to said planar member, a second pair of parallel support members hingedly attached at a forward end thereof to a top portion of said sidewalls, each one of said first pair of parallel support members being pivotally attached to one of said second pair of parallel support members, and a hinge means for connecting each of said first pair of support members to said top portion of said side wall, said hinge means further comprising:

a longitudinal member extending parallel to said sidewalls;

a block having a longitudinal opening formed therein such that said longitudinal member may be received therein in sliding longitudinal relation, said block surrounding said longitudinal member with said opening having a transverse dimension smaller than the transverse dimension of said longitudinal member;

connective means carried by said block for hingedly connecting one of said parallel support members to said block; and means extending into said opening for affixing said longitudinal member to a support surface.

2. A cover as defined in claim 1 wherein said longitudinal members are horizontal rods affixed to said sidewalls of said pickup truck.

3. A cover as defined in claim 2 wherein said means extending into said opening for affixing said rods to said sidewalls are screws extending upward through said sidewalls.

4. A cover as defined in claim 1 wherein said connective means includes coaligned apertures which extend transversely through said parallel support member and said block, a horizontal member extending through said coaligned apertures such that said support member pivot about the axis of said horizontal member.

5. A cover as defined in claim 4 wherein said horizontal member has defined therein a relieved portion to accommodate said longitudinal member received within said block.

6. A cover as defined in claim 5 wherein said horizontal member is a pivot pin defining a concave relieved portion near the center of said pin.

7. A cover as defined in claim 1 wherein said planar member is a rectangular metal frame covered with a flexible material.

8. A cover as defined in claim 1 wherein said planar member is a rectangular frame affixed to rigid plastic material.

9. A cover for use on the bed of a pickup truck wherein said bed comprises a pair of longitudinally disposed parallel side walls, said cover comprising:

(a) a rectangular planar member of sufficient dimension to simultaneously cover both sidewalls of said bed;

(b) a first pair of parallel support members hingedly attached at a forward end thereof to said planar member, a second pair of parallel support members hingedly attached at a forward end thereof to the top of said sidewalls, each one of said first pair of parallel support members being pivotally attached to one of said second pair of parallel support members; and (c) a hinge means comprising a longitudinal member extending parallel to said sidewalls, a block having a longitudinal opening formed therein such that said longitudinal member may be received therein in sliding longitudinal relation, said block surrounding said longitudinal member with said opening having a transverse dimension smaller than the transverse dimension of said longitudinal member, a connective means carried by said block for hingedly connecting one of said parallel support members to said block; and means extending through said opening for affixing said longitudinal members to a support surface.

10. A cover as defined in claim 9 wherein each of said parallel support member rests in longitudinal abutment with the top of said sidewalls when said planar member is in a lowermost position.

11. A cover as defined in claim 9 wherein said longitudinal members are horizontal rods affixed to said sidewalls of said pickup truck.

12. A cover as defined in claim 11 wherein said means extending through said slot for affixing said rods to said sidewalls are screws extending upward through said sidewalls.

13. A cover as defined in claim 9 wherein said connective means includes coaligned apertures which extend transversely through said parallel support member and said block, a horizontal member extending through said coaligned apertures such that said support member pivot about the axis of said horizontal member.

14. A cover as defined in claim 13 wherein said horizontal member defines a relieved portion for the accommodation of said longitudinal member received within said block.

15. A cover as defined in claim 14 wherein said horizontal member is a pivot pin defining a concave relieved portion near the center of said pin.

* * * * *